United States Patent [19]

Moore et al.

[11] 4,293,476
[45] Oct. 6, 1981

[54] INTERFACIAL CROSS-LINKING OF LATEX FILMS

[75] Inventors: Carl Moore; Robert A. Kirchoff, both of Midland, Mich.

[73] Assignee: The Dow Chemical Company, Midland, Mich.

[21] Appl. No.: 63,279

[22] Filed: Aug. 2, 1979

[51] Int. Cl.$^3$ .............................................. C08L 51/04
[52] U.S. Cl. ...................... 260/29.7 W; 260/29.6 RW; 260/29.6 WB; 260/29.6 H; 525/902
[58] Field of Search ............ 260/29.6 RW, 29.6 WB, 260/29.6 RB, 29.6 H, 29.7 W, 29.7 D, 29.7 DP, 29.7 UP; 525/902

[56] References Cited

U.S. PATENT DOCUMENTS

| | | | |
|---|---|---|---|
| 3,215,647 | 11/1965 | Dunn | 260/2.5 |
| 3,457,209 | 7/1969 | Mikofalvy | 260/29.6 RW |
| 3,745,196 | 7/1973 | Lane | 260/29.6 RB |
| 3,912,682 | 10/1975 | Tucker | 260/29.7 H |
| 4,082,884 | 4/1978 | De Long | 260/29.6 RW |
| 4,098,746 | 7/1978 | Becker | 260/29.6 RW |
| 4,126,595 | 11/1978 | Martorano | 260/29.6 RW |

*Primary Examiner*—Paul R. Michl

[57] ABSTRACT

Cross-linked, synthetic polymer compositions comprising an aqueous polymer dispersion of (1) heterogeneous polymer particles having a high concentration of reactive groups such as an activated halogen on their surface and (2) a water-soluble coreactive component bearing a plurality of reactive groups coreactive with the reactive groups of the heterogeneous polymer particle, e.g.,

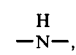

are useful for preparing strong films or coatings. For example, a polymer composition consisting of an aqueous colloidal dispersion of heterogeneous polymer particles having a shell layer derived from a reactive monomer such as vinylbenzyl chloride and a coreactive component of triethylenetetraamine can be applied to a suitable substrate and cross-linked to form a strong, water-resistant film.

17 Claims, No Drawings

INTERFACIAL CROSS-LINKING OF LATEX FILMS

BACKGROUND OF THE INVENTION

This invention relates to cross-linkable polymer compositions and to the cross-linked compositions prepared therefrom.

By reason of their desirable physical and chemical properties such as elasticity, pigment binding power and solvent resistance, synthetic polymer latexes are widely used as paints or coating materials for paper, carpets and the like. In such applications, the latexes, when applied, are aqueous dispersions of small (generally colloidal size), individual polymer particles which coalesce upon drying to form a continuous, adherent film. Upon aging, further coalescense improves the film's properties, e.g., increases toughness and solvent resistance.

To enhance the physical and chemical properties of the coatings prepared from the synthetic polymer latexes, it is often advantageous to cross-link (used interchangeably with the term cure) the polymers. Many polymers are prepared in latex form from monomers having sufficient functionality to polymerize and subsequently cross-link in the absence of a cross-linking agent. For example, a latex of a copolymer of styrene and butadiene contains residual carbon-to-carbon unsaturation which unsaturation provides cross-linking between polymer chains, thereby further enhancing the dried film properties. See, *Treatise on Coatings*, edited by R. R. Myers and J. S. Long, Vol. 1, published in 1968 by Marcel Dekker, Inc., New York, Chapter 1, "Styrene-Butadiene Latexes in Protective and Decorative Coatings," by F. A. Miller, pages 1–57. Alternatively, other reactive groups can provide the reactive sites for cross-linking. For example, U.S. Pat. No. 3,297,621 proposes preparing a curable latex composition by copolymerizing a monomer having carboxy groups such as methacrylic acid with a monomer having oxiranyl groups such as glycidyl methacrylate. Similarly, a curable latex composition of a polymer having a core of polyvinyl chloride and a shell derived from one or more of an α,β-olefinically unsaturated carboxylic acid, an amine, a N-alkylol or N-alkoxyalkyl amide or an ester of acrylic or methacrylic acid is disclosed in U.S. Pat. No. 4,002,801. Other cross-linkable latexes are discussed in *The Application of Synthetic Resin Emulsions*, by H. Warson, published in 1972 by Ernest Benn Limited, London, Chapter IX, "Cross-Linking Industrial Finishes."

Unfortunately, such latex compositions cure relatively slow, often requiring a high temperature and/or long cure times. In many cases, curing temperatures of 150° C. or above are required to sufficiently cross-link the latex film to provide desirable strength properties, hardness and resistance to chemical attack. Although these curing temperatures are economically undesirable, lower temperature cures often produce films of undesirable low strength properties and/or require extensive time to cure.

Alternatively, a cross-linking agent, i.e., a polyfunctional compound reactive with the polymers which reaction serves as a cross-linkage between the polymer molecules can be employed to cross-link the polymer particles. For example, U.S. Pat. No. 3,069,376 discloses that a dispersion of (1) a copolymer of an unsaturated carboxylic acid, a monohydric alcohol and an ester of an unsaturated carboxylic acid and (2) a ethoxyline resin cross-linking agent cures to a hard film. Similarly, a latex composition comprising a copolymer of an acrylic ester and an unsaturated azolide cures upon the addition of a polyfunctional alcohol or amine. See, U.S. Pat. Nos. 3,912,682; 3,955,041 and 3,956,216. Unfortunately, such latex compositions, which are relatively expensive, cure relatively slow; requiring lengthy cure times and/or high temperatures to achieve maximum film properties.

In view of the stated deficiencies of the prior art, it would be highly desirable to provide curable latex compositions which cure relatively quick at low temperatures sufficient to form strong, solvent-resistant films or coatings.

SUMMARY OF THE INVENTION

Accordingly, in one aspect, the present invention is a cross-linkable, synthetic polymeric composition comprising an aqueous dispersion of heterogeneous polymer particles which comprise a water-insoluble polymeric core having a reactive polymer domain on its surface. The reactive polymer domain has an average thickness of up to about 100 Å and is derived from an amount of a reactive monomer bearing a non- or weakly ionic reactive group such that the reactive groups are more concentrated in the reactive polymer domain than in the polymeric core of the heterogeneous polymer particle. A water-soluble coreactive component bearing a plurality of a second non- or weakly ionic reactive group coreactive with the reactive groups of the reactive polymer domain of the heterogeneous polymer particle is dispersed within the curable composition.

In another aspect, the present invention is the cross-linked compositions prepared therefrom.

Surprisingly, the polymer compositions of this invention cure relatively fast, e.g., 5 minutes at 100° C., to produce films or coatings having excellent tensile strengths. In many cases, a room temperature cure is sufficient to form hard, solvent-resistant films.

In an embodiment of particular interest, the reactive monomer and coreactive component are employed in amounts such that the tensile strength of a film prepared from the curable composition of this invention is measurably higher than a film prepared from an identical curable composition except that the polymer particles are homogeneous, i.e., the amount of the reactive monomer in the polymer particle is the same as that amount employed in preparing the heterogeneous polymer particle but such amount of monomer is essentially uniformly distributed throughout the particle. In such embodiment, the curable compositions of this invention require less of the reactive monomer based on the total weight of the polymer particle to prepare equivalent strength films.

Many of the cured films prepared from the curable polymer compositions of this invention exhibit good adhesion to a wide variety of substrates and possess good abrasion resistance and excellent tensile strength. In addition, they are often less sensitive to water and organic solvents than similar conventional coatings. Moreover, they exhibit excellent resistance to the deleterious effects of mild aqueous solutions on prolonged contact. Accordingly, they have utility as coating compositions for a wide variety of substrates such as metal, wood and the like; as backing material for carpets and upholstery and as binders for fabric and papers.

DETAILED DESCRIPTION OF THE PREFERRED EMBODIMENTS

For the purposes of this invention, the reactive polymer and coreactive component contain nonionic or weakly ionic reactive groups which are capable of chemically reacting with one another at the curing conditions described herein (i.e., coreactive groups) to form a covalent bond. As used herein, the term "nonionic" means that essentially none of the reactive groups of the reactive polymer or coreactive component are ionized in water at neutral pH. By "weakly ionic" it is meant that such reactive groups are only partially ionizable in water at ambient temperatures, e.g., the acidity (pKa) of the reactive group is at least about 3 or the basicity (pKb) of the reactive group is at least about 2.5. For example, one of the reactive groups can be a nonionizable halo group (i.e., X, wherein X is fluorine, chlorine, bromine or iodine, preferably chlorine) such as the coreactive halo group pendant from a polymerized vinylbenzyl halide, a halide of an alkyl ester of an $\alpha,\beta$-ethylenically unsaturated carboxylic acid or an $\alpha,\beta$-ethylenically unsaturated halide ether. The reactive group coreactive with the halo group can be an amino (—NH$_2$) or substituted amino group (—NHR wherein R is a hydrocarbyl such as an alkyl, aryl, cycloalkyl or aralkyl; an N-substituted hydrocarbyl; or an inertly substituted hydrocarbyl, i.e., the hydrocarbyl group bears one or more substituent groups such as —OCH$_3$ which are inert to the polymerization and cross-linking reactions described hereinafter). Other of such coreactive groups are well known in the art. See, for example, U.S. Pat. Nos. 3,215,647 and 3,450,681, all of which are hereby incorporated by reference. Representative of such other coreactive groups are epoxy groups which are coreactive with groups such as carboxyl-containing groups, hydroxy groups and amino or substituted amino groups; and hydroxy groups, advantageously primary or secondary hydroxy groups, which are coreactive with carboxy-containing groups or carboxamides, i.e.,

groups. As used in the present invention, the term "carboxy-containing groups" includes carboxy groups (i.e., —COOH), hydrocarboxy carbonyl groups (i.e., —COOR wherein R is a hydrocarbyl or inertly substituted hydrocarbyl as hereinbefore described), and halocarbonyl groups (i.e., —COX wherein X is as hereinbefore described).

The aqueous polymer dispersion (commonly referred to as a latex) of the present invention is a dispersion consisting of a continuous aqueous phase having distributed therethrough finely divided heterogeneous polymer particles. In general, the heterogeneous polymer particles are of a size ranging from about 500 Å to about 10,000 Å, advantageously, from about 1,000 Å to about 3,000 Å. The heterogeneous polymer particles of this invention are characterized as having a water-insoluble polymeric core having on its surface a discrete region or domain of a reactive polymer bearing a plurality of pendant coreactive groups. The distribution of the reactive polymer domain on the surface of the polymeric core may vary. For example, the polymeric core can be circumscribed, i.e., encapsulated, by the reactive polymer domain. Alternatively, the reactive polymer domain may exist as several, i.e., two or more, discontinuous regions on the surface of the polymeric core. Advantageously, the polymeric core is encapsulated by the reactive polymer domain, i.e., the reactive polymer domain forms a shell covering the polymeric core.

In this invention, the reactive polymer domain has an average thickness of up to about 100 Å and comprises an amount of the reactive monomer such that the reactive groups are concentrated on or near the surface of the heterogeneous polymer particle. For the purposes of this invention, the reactive polymer domain is presumed to comprise the reactive monomer and other monomers, if any, copolymerized therewith. Preferably, the average thickness of the reactive polymer domain ranges from about 2 Å to about 75 Å, more preferably from about 5 Å to about 60 Å. The average thickness is presumed to be the difference in the radius of the polymeric core and the radius of the heterogeneous polymer particle, i.e., polymeric core plus the reactive polymer domain, wherein the radii of the polymeric core and heterogeneous polymer particle are one-half their respective number average particle sizes as determined using conventional techniques, i.e., dissymetry measurement techniques. The reactive groups coreactive with the reactive groups of the coreactive component are more concentrated in the reactive polymer domain than in the polymeric core of the heterogeneous polymer particle. Advantageously, the concentration (i.e., milliequivalents per gram) of such reactive groups in the reactive polymer domain is at least about 5, more preferably at least about 10, times the concentration of reactive groups in the polymeric core.

The water-insoluble polymeric core (herein referred to as "polymeric core") is advantageously prepared from one or more monomers (hereinafter referred to as starting monomers) which monomers have been conventionally employed hereto in the preparation of water-insoluble polymer particles using emulsion polymerization techniques. Illustrative of such monomers are those presented in *Polymer Processes*, edited by Calvin E. Schildknecht, published in 1956 by Interscience Publishers, Incorporated, New York, Chapter IV, "Polymerization in Emulsion" by H. Leverne Williams. In Table II on pages 122–133 are listed diverse kinds of monomers which can polymerize alone (homopolymers) or in mixtures (copolymers) useful as the polymeric core of the heterogeneous polymer particles of this invention. Such monomers include the monovinylidene aromatics such as styrene, $\alpha$-methyl styrene and similarly substituted styrenes, vinyl naphthalene, vinyl toluene and the like; vinyl aliphatic and alicyclic hydrocarbons such as 1,3-butadiene, methyl-2-butadiene, 2,3-dimethyl butadiene, cyclopentadiene; and $\alpha,\beta$-ethylenically unsaturated acids such as acrylic acid, methacrylic acid esters thereof; and halogen containing olefinic monomers wherein the halogen is essentially inert at the curing conditions hereinafter described such as vinyl halide, e.g., vinyl chloride and vinyl bromide, and vinylidene halide, e.g., vinylidene chloride.

In addition to such monomers, the polymeric core can advantageously contain small amounts, e.g., up to about 15 weight percent, of a suitable ethylenically unsaturated monomer which contains two or more nonconjugated terminal ethylenic groups. Examples of such monomers are divinyl benzene, 1,3-butylene diacrylate, ethylene glycol dimethacrylate, diallyl phthalate and the like. If employed, such monomers advantageously comprise from about 1 to about 10 weight percent of the polymeric core.

Although less preferred, the polymeric core of the heterogeneous polymer particle can be composed of monomers which are not readily emulsion polymerizable using methods well known in the art for converting such polymers to latex form. Representative of such monomers are isobutene; stereospecific polyisoprene, polybutadiene or the like; preformed polymers and copolymers of monoolefins having 2 to 20 carbon atoms such as ethylene, propylene, 1-butene, 2-butene, hexene and the like; alkyd resins; block and graft copolymers; epoxy resins and thermosettable vinyl ester resins. Of such polymers, monoolefins of up to 8 carbon atoms, especially copolymers of ethylene and propylene; block and graft copolymers of styrene and butadiene and the epoxy resins, especially the reaction product of epichlorohydrin and bisphenol-A, are most desirable.

While the polymeric core may also comprise one or more of the reactive monomers hereinafter described, such is not generally preferred. When employed in the polymeric core, the amount of said reactive monomers is preferably relatively small (less than about 10, especially less than about 5 weight percent) and such that there is no more than about 0.03 milliequivalent of reactive groups per gram of the polymeric core.

As the polymeric core constitutes a major amount of the heterogeneous polymer particle, the monomers employed in its preparation affect the properties of the polymer particles and the products prepared therefrom. Therefore, the monomers employed in the preparation of the polymeric core are typically selected on the basis of their polymeric properties. In general, readily emulsion polymerizable monomers are advantageously employed in the preparation of the insoluble domain. More specifically, the insoluble polymer domain is advantageously a homopolymer of a conjugated diene such as 1,3-butadiene or methyl-2-butadiene or a copolymer of a conjugated diene with a monovinylidene aromatic such as styrene and vinyltoluene, or vinylidene chloride. Preferably, the polymeric core is a homopolymer of 1,3-butadiene or a copolymer of a conjugated diene and a monovinylidene aromatic. Advantageously, said copolymer is prepared using from about 45 to about 95, preferably from about 55 to about 85, mole percent of the conjugated diene and from about 55 to about 5, preferably from about 45 to about 15, mole percent of the monovinylidene aromatic. Most preferably, the conjugated diene is 1,3-butadiene and the monovinylidene aromatic is styrene.

The reactive polymer domain of the heterogeneous polymer particle is advantageously derived from one or more addition polymerizable monoethylenically unsaturated monomers (hereinafter referred to as reactive monomers) bearing a non- or weakly ionic reactive substituent group as hereinbefore described, which group does not interfere with the preparation of the heterogeneous polymer particle. A monomer having a substituent group which, subsequent to polymerization, can be converted to such reactive group, e.g., ester or salt groups which can be hydrolyzed to reactive acid groups, can also be employed in the preparation of the reactive polymer domain.

Preferably, such reactive monomers are hydrophobic and oil soluble, easily emulsion polymerizable, do not inhibit free radical polymerization and diffuse at a satisfactory rate through the aqueous medium to the polymer particle of the starting latex as hereinafter defined.

Examples of such monomers include the ethylenically unsaturated monomers containing nonionic halo groups including the monovinylidene aromatic compounds having a halogen atom attached to a benzyl carbon atom (i.e., that atom attached directly to the benzene ring) such as vinylbenzyl chloride and vinylbenzyl bromide; halides of alkyl esters of $\alpha,\beta$-ethylenically unsaturated carboxylic acids, e.g., 2-chloroethyl methacrylate and $\alpha,\beta$-ethylenically unsaturated halide ethers, e.g., chloromethyl vinyl ether. Other suitable reactive monomers include ethylenically unsaturated monomers containing epoxy groups such as the epoxides of alkyl esters of $\alpha,\beta$-ethylenically unsaturated carboxylic acids (e.g., glycidyl methacrylate); ethylenically unsaturated monomers containing amino or substituted amino groups such as the aminoalkyl esters of an $\alpha,\beta$-ethylenically unsaturated carboxylic acid (e.g., 2-aminoethyl acrylate and 2-aminoethyl methacrylate); vinyl pyridine; allyl amine; ethylenically unsaturated monomers containing a primary or secondary hydroxy group such as $\alpha,\beta$-ethylenically unsaturated alcohols (e.g., 2-propen-1-ol), hydroxy containing monovinylidene aromatics (e.g., phenol, 2-propenyl) and the hydroxy alkyl esters of acrylic and methacrylic acid (e.g., hydroxypropyl acrylate, hydroxyethyl acrylate and hydroxyethyl methacrylate); ethylenically unsaturated monomers containing a carboxy group such as $\alpha,\beta$-ethylenically unsaturated acids (e.g., acrylic and methacrylic acid); alkyl esters of such acids (e.g., ethyl acrylate) and chlorides of such acids; and the like. Of the reactive monomers, those bearing halo groups or oxiranyl groups are advantageously employed herein, with glycidyl methacrylate and vinylbenzyl halide, particularly vinylbenzyl chloride, being preferred.

In this invention, the reactive monomer is employed in amounts such that when the aqueous polymer dispersion is combined with the coreactive component of the type and in amounts hereinafter described, the resulting composition is curable, i.e., the resulting composition contains sufficient reactivity such that the reaction between the reactive groups on the heterogeneous polymer latex particle and the coreactive component render the composition normally solid and insoluble in toluene. Advantageously films formed from the resulting composition exhibit an increased tensile strength when compared to films prepared from an identical composition which contains no coreactive component. By the term "increased tensile strength" it is meant that the tensile strength is increased by an amount measurable using conventional test methods, e.g., the method of Note 1, Table I. Such tensile strength is advantageously increased by at least about 50 percent, more advantageously by at least 100 percent.

In an embodiment of particular interest, the reactive monomer is employed in an amount such that the tensile strength of a film (advantageously being from about 0.1 to about 1 mm thick) prepared from the curable polymeric composition of this invention is increased by a measurable amount when compared to a film prepared from a similar polymeric composition comprising a coreactive component and homogeneous polymer particles which are prepared from the same type and total amount of monomers employed in preparing the heterogeneous polymer particle, i.e., while the amount of the reactive monomer in the homogeneous polymer particle is the same as that amount employed in the preparation of the heterogeneous polymer particles, the reactive monomer (or reactive groups) is essentially uniformly distributed throughout the polymer particle rather than being concentrated on or near the particle's surface. Preferably, such tensile strength increase is at least about 10, more preferably at least about 25, most preferably at least about 100, percent.

The increased tensile strength is believed to be due to the formation of a cross-linked network at the particle interface of two or more heterogeneous polymer particles resulting from the reaction between the coreactive groups in the heterogeneous particle and coreactive groups of the coreactive component. Preferably, such tensile strength increases are exhibited on films which are cured for 10 minutes at about 100° C. More preferably, such tensile strength increases are exhibited in films which have been air dried for about 2 to about 4 hours at room temperature, i.e., from about 18° to about 25° C.

To achieve the preferred tensile strength increases, the reactive monomer is generally employed in an amount such that there are at least about 0.3, preferably at least about 1.0, more preferably at least about 2.0, milliequivalents of reactive groups per gram of the reactive polymer domain. Advantageously, provided such amounts of reactive groups are present, the reactive polymer domain comprises, in polymerized form, from about 30 to about 90, more advantageously from about 40 to about 80, weight percent of the reactive monomer.

In addition, copolymerizable ethylenically unsaturated monomers bearing a pendant, reactive group which monomers are not readily polymerizable in emulsion, e.g., form water-soluble homopolymers, may be copolymerized with the hydrophobic, ethylenically unsaturated reactive monomers hereinbefore described to form the reactive polymer domain. Examples of such reactive monomers forming a water-soluble polymer include the salt form of $\alpha,\beta$-ethylenically unsaturated carboxylic acid and N-methylol acrylamide. When employed, the reactive monomers which form water-soluble homopolymers preferably comprise less than about 80, more preferably less than about 60, weight percent of the total weight of reactive monomers employed.

Optionally, readily emulsion polymerizable, ethylenically unsaturated monomers which do not bear a coreactive group can be copolymerized with the reactive monomers. Preferably, such monomers are those emulsion polymerizable monomers hereinbefore described suitably employed in preparing the polymeric core. When employed, such monomers beneficially comprise up to about 70, more preferably from about 20 to about 60, weight percent of the reactive polymer domain.

In the normal practice of this invention, the aqueous dispersion of the heterogeneous polymer particles is prepared by emulsion polymerizing the reactive monomer in an aqueous medium containing particles of the water-insoluble polymer (hereinafter referred to as a starting latex). In general, the starting latex is prepared using conventional emulsion polymerization techniques which involve dispersing the desired monomers in an aqueous polymerization medium which typically contains an emulsifying agent, i.e., surfactant (generally from about 0.1 to about 5 weight percent based on the total weight of the starting monomers), and other conventionally employed polymerization aids, e.g., chain transfer agent, chelating agent and the like, and exposing the monomers to a free radical initiation means. Polymerization of the monomers to form water-insoluble polymer particles generally consists of heating the emulsified mixture to temperatures from about 50° to about 110° C., preferably from about 70° to about 100° C., for periods sufficient to convert the desired amounts of the monomer to polymer.

Alternatively, conventional seeding procedures can be employed in the preparation of the starting latex. Typically, such seed is employed in amounts from about 0.1 to about 1 weight percent, said weight percent being based on the total weight of the monomers employed. Although the monomeric composition of the seed may vary, it is advantageously substantially the same as that used in the preparation of the water-insoluble polymer particle.

The heterogeneous polymer particles are then prepared from the starting latex by adding the reactive monomer to the starting latex and maintaining the resulting dispersion at conditions such that following polymerization, the reactive monomer lies on or near the surface of the polymer particle. Advantageously, the reactive monomers are added to the starting latex before all the starting monomers have been converted to polymer and copolymerizing the reactive monomer with the residual starting monomer to substantially complete conversion. Alternatively, but generally less preferred, the reactive monomer is added to a reaction mixture of the starting latex containing essentially no residual starting monomer(s). Subsequent polymerization of the added reactive monomers is initiated and continued until essentially complete conversion. Advantageously, the starting latex does not contain sufficient residual surfactant to initiate new polymer particles when the additional monomer is added.

During the addition of the reactive monomer, the ratio of the reactive monomer to the starting latex is advantageously kept low to avoid swelling the existing water-insoluble polymer particles of the starting latex and to prevent the reactive groups from being buried in these polymer particles. As such, continuous or incremental addition (added as shots in two or more increments) of the reactive monomer to the aqueous medium of the starting latex is preferred. Advantageously, any hydrophobic monomer(s) which is to be copolymerized with the reactive monomer is added simultaneously, preferably as a mixture with the reactive monomer. Also advantageously added with the reactive monomer is a free radical initiator, as hereinafter described, to activate the particle surface of the starting latex, i.e., set up a steady state concentration of free radicals. Addition of such initiator is desirable, although not essential, when the reactive monomer is prepared in situ with the starting latex (added to the starting latex before all the starting monomer is converted to polymer). Often, additional amounts of surfactant are also advantageously added with the reactive monomers to maintain the stability of the dispersion during polymerization of the reactive monomers.

Free radical initiation means employed in preparing the water-insoluble polymer particles and subsequently added with the reactive monomers includes UV light, heat and/or conventional chemical initiators such as the peroxygens (e.g., t-butyl hydroperoxide, cumene hydroperoxide and hydrogen peroxide), persulfates (e.g., potassium persulfate, sodium persulfate and ammonium persulfate) and the like. Typically, such initiators are employed in conventional amounts in the preparation of the polymer particles of the starting latex. Such amounts generally range from about 0.01 to about 5 weight percent of the total weight of the starting monomers. During the addition of the reactive monomers, an additional amount of the initiator of up to about 5 weight percent of the reactive monomer is optionally added to the polymerization medium.

Surfactants suitably employed in the practice of this invention include cationic, anionic and nonionic surfactants employed hereto in conventional emulsion polymerizations. Illustrative examples of such surfactants are listed in McCutcheon's *Detergents and Emulsifiers*, edited by J. W. McCutcheon, published in 1977 by John W. McCutcheon, Inc., Morristown, N.J. Representative cationic surfactants listed therein which are useful in the practice of this invention include the salts of aliphatic amines, especially fatty amines; quaternary ammonium salts and hydrates; fatty amides derived from disubstituted diamines; fatty chain derivatives of pyridinium compounds; ethylene oxide condensation products of fatty amines; sulfonium compounds; isothiouronium compounds and phosphonium compounds. Representative anionic surfactants useful herein include the alkyl aryl sulfonates such as sodium dodecyl benzene sulfonate, alkyl phenoxy polyethylene sulfonates, sodium lauryl sulfate, common soaps and the like. Representative nonionic surfactants useful herein include the reaction product of an alkylene oxide with alkylated phenols or long chain, e.g., about 6 to about 20 carbon atoms, fatty alcohols, fatty acids, alkyl mercaptans and primary amines; monoesters, e.g., the reaction product of polyethylene glycol with a long chain carboxylic acid with polyglycol ethers of polyhydric alcohol.

Of such surfactants, those which effectively stabilize the dispersion during the polymerization of the reactive polymers and which do not neutralize or otherwise effect the reactive groups in the resulting curable polymer composition are advantageously employed. Such surfactants will vary depending on a variety of factors including the type of monomers employed in preparing the heterogeneous polymer particles. Particularly critical to the choice of surfactant is the type of reactive monomer to be employed. For example, cationic surfactants, preferably cationic surfactants having pH independent cationic groups, especially fugitive surfactants wherein the cationic group is sulfonium, sulfoxonium, isothiouronium or a reducible quaternary nitrogen group, e.g., pyridinium or quinolinium, are advantageously employed in conjunction with systems involving a halogen containing reactive monomer, e.g., vinyl benzyl chloride. Alternatively, anionic surfactants are more advantageously employed in conjunction with oxiranyl containing reactive monomers, e.g., glycidyl methacrylate. In the preparation of the starting latex, the surfactant is generally advantageously employed in amounts ranging from 0.1 to about 5 weight percent based on the total weight of the starting monomers. An additional amount of the surfactant, generally ranging up to about 2 weight percent of the reactive monomers is often advantageously added with the reactive monomers.

Polymerization of the added reactive monomers is advantageously carried out at as low a temperature as will provide a practical polymerization rate. Such temperatures generally range from about 40° to about 100° C., preferably from about 50° to about 90° C.

The coreactive cross-linking agent employed in the curable compositions of this invention is a water-soluble material which bears a plurality of non- or weakly ionic reactive groups, which, at conditions sufficient to cure the composition as exemplified herein, are coreactive with the reactive group pendant to the reactive polymer of the heterogeneous polymer particle. For the purposes of this invention, water-soluble materials are defined as those materials which form a true solution in water, i.e., individual molecules of the component are dispersed in water or in a mixture of water and a water-miscible solvent. In general, the coreactive component is a simple molecule such as ammonia or a monomer compound, i.e., a compound capable of being converted to a polymer by the combination with itself or another compound. Alternatively, water-soluble polymers bearing suitable reactive groups can be employed.

Representative of such compounds bearing non- or weakly ionic amino or substituted amino groups are ammonia, and the polyamines of aliphatic, alicyclic and aromatic hydrocarbons or inertly substituted aliphatic, alicyclic or aromatic hydrocarbons which have two or more amino hydrogen atoms per molecule. Examples of such coreactive components are the polyalkylene polyamines such as the polymethylenediamines (e.g., ethylenediamine, 1,3-propanediamine and 1,6-hexadiamine), diethylenetriamine, triethylenetetraamine, tetraethylenepentaamine; monoethanolamine; quanidine, cyclic amines such as piperazine; alicyclic amines such as menthanediamine; and aliphatic amines containing aromatic groups such as m-xylenediamine and the like. Water-soluble polymers bearing reactive amino and substituted amino groups include polyethyleneimine, preferably with a number average molecular weight of from about 3000 to about 60,000 as measured by gel permeation chromatography and the water-soluble polymers of allyl amine and aminoalkyl esters of $\alpha,\beta$-ethylenically unsaturated carboxylic acids (e.g., acrylic or methacrylic acid) such as 2-aminoethyl acrylate and 2-aminoethyl methacrylate.

Representative coreactive components bearing non- or weakly ionic carboxyl-containing groups include the polycarboxylic acids such as oxalic, malonic, succinic, glutaric and phthalic acid and the water-soluble polymers of $\alpha,\beta$-ethylenically unsaturated carboxylic acids such as poly(acrylic acid) or poly(methacrylic acid).

Hydroxy containing coreactive components include the polyhydric alcohols including glycols such as ethylene glycol, diethylene glycol, triethylene glycol and tetraethylene glycol; glycerol; glycerol condensation polymers such as diglycerol, hexaglycerol and decaglycerol; sorbitol; tetrahydroxybutane; pentaerythritol and water-soluble hydroxyl containing polymers such as hydroxy alkyl esters of $\alpha,\beta$-ethylenically unsaturated carboxylic acids, e.g., hydroxyethyl acrylate.

The coreactive component most advantageously employed herein depends on a variety of factors including the type and proportion of the monomers employed in preparing the heterogeneous polymer particle, the type and amount of the coreactive component employed and the like. In general, with a heterogeneous polymer particle having a reactive polymer domain prepared from a reactive monomer bearing a halo or oxiranyl group, a coreactive component which bears an amino or substituted amino group is advantageously employed. Preferably, the amino containing coreactive component is a polyalkylene polyamine or a cyclic amine such as piperazine.

In general, the coreactive component may be employed in any amount sufficient to form a curable composition, as that term is defined hereinbefore. In the preferred embodiment, the coreactive component is employed in an amount to provide films having increased tensile strengths when compared to films prepared from a similar composition of homogeneous polymer particles. This amount will vary depending on the specific coreactive component and heterogeneous polymer particles employed. In the preferred embodiment, the coreactive component is advantageously employed in amounts such that in the curable composition the equivalents of reactive groups pendant to the coreactive component is at least about 0.5, advantageously at least about 0.8, times the equivalents of reactive groups in the reactive polymer domain of the heterogeneous polymer particle. In general, the curable composition comprises from about 0.2 to about 10, preferably 0.5 to about 5, more preferably from about 0.6 to 2, weight percent of the coreactive component based on the weight of the aqueous polymer dispersion.

In the normal practice of this invention, the aqueous polymer dispersion is combined with the neat form of the coreactive component. Alternatively, the coreactive component can be employed in the form of an aqueous solution or as a solution with a water-soluble solvent. To retain stability of the dispersion upon the combination of the polymer particles and coreactive component, a surfactant compatible with the surfactant(s) used in preparing the starting latex, with the reactive groups in the reactive polymer domain of the heterogeneous polymer particle and with the reactive groups on the coreactive component, is advantageously added coincident therewith. A nonionic surfactant such as nonylphenoxypoly(ethyleneoxy)ethanol is preferred for most applications.

Optionally, other adjuncts such as clay, talc, chalk and $TiO_2$ may be added to the curable latex composition as extenders, fillers, pigments or the like. Although most of the conventionally employed fillers, extenders, pigments or the like are suitably employed in the practice of this invention, such adjuncts may affect the properties of the curable latex compositions, e.g., strength properties or latex stability. Therefore, testing of the latex composition by methods hereinafter described is advantageously carried out to determine such effects.

The conditions at which the curable compositions are most advantageously cured are dependent on various factors, including the specific monomers employed in preparing the heterogeneous polymer particle, the specific coreactive component and the concentration of each. Typically, in the preferred compositions, ambient temperatures are sufficient to cure the resulting curable composition, although higher temperature cures may be employed to reduce the time required to dry the film and further increase the strength. Beneficially, such higher temperatures are generally from about 90° to about 125° C. At these temperatures, cure times of between about 2 and about 10 minutes are advantageously employed. Moreover, cure catalysts which promote the reaction between the coreactive groups such as acids or bases are often advantageously employed.

The following examples are set forth to illustrate the invention and should not be construed to limit its scope. In the examples, all parts and percentages are by weight unless otherwise indicated.

EXAMPLE 1

To a 4.5 l-glass lined, jacketed pressure vessel equipped with agitation means, thermometer, heating and cooling means, monomer and aqueous feed reservoirs and metering pumps is added 142 parts water, 1 part dodecylbenzyl dimethylsulfonium chloride surfactant and 0.4 part 2,2'-azobisisobutyronitrile initiator. The vessel is purged with nitrogen and heated to 75° C. A monomer feed consisting of 52 parts styrene, 28 parts butadiene and 0.2 part dodecanethiol is added to the vessel over a 5-hour period concurrently with an aqueous feed stream of 63 parts water, 1 part dodecylbenzene dimethylsulfonium chloride and 0.25 part 2,2'-azobisisobutyronitrile. The vessel is maintained at 75° C. during this addition and for an additional 3.5 hours. At this time, the polymer particles (i.e., polymeric core) are found to have a number average particle size of about 1240 Å. A monomer feed of 10 parts of vinylbenzyl chloride, 3 parts of styrene and 7 parts of butadiene is begun which continues for a period of 2 hours. The temperature of the vessel is maintained at 75° C. during this addition and for an additional 3 hours. The flask is then cooled to 25° C. The resulting aqueous dispersion of heterogeneous polymer particles consists of 38.3 percent solids at a pH of 3.25. The number average particle size of the heterogeneous polymer particles is determined to be 1340 Å by conventional dissymmetry measurement techniques. The heterogeneous polymer particles thus have a reactive polymer domain having a thickness of 50 Å.

A curable polymeric composition of the present invention is prepared by adding 0.9 part of a coreactive component (polyethyleneimine having a number average molecular weight of 40,000 as determined by gel permeation chromatography) and 1.5 parts of nonylphenoxypoly(ethyleneoxy)ethanol sold as Igepal CO-630 by GAF Corporation, Dyestuff and Chemicals Division, to a 125.5-part portion of the resulting aqueous polymer dispersion. No additives are added to a second portion of the aqueous polymer dispersion (Sample No. C).

Both dispersion portions are cast on glass plates at a wet thickness of 0.25 mm and air dried for 4 hours. Each film is dusted with talc and stripped from their respective plate. A portion of each film is tested for tensile strength (Tens.) and elongation at break (Elong.). The remainder of each film is mounted on a glass plate and then heated in a forced air oven for 5 minutes at 120° C. A portion of these films is tested for tensile strength and elongation at break. The results of this testing are presented in Table I.

TABLE 1

| Sample | Air Dried | | Air Dried + 5 Min. @ 120° C. | |
|---|---|---|---|---|
| | Tens., Kg/cm²[1] | Elong., %[2] | Tens., Kg/cm² | Elong., % |
| C* | 33.3 | 472 | 65.0 | 520 |
| 1 | 92.2 | 327 | 164.0 | 346 |

*Not an example of this invention.
[1]Tensile strength is measured by pulling a dumb bell shaped sample of each film having dimensions of 12.7 cm by 2.5 cm and having a thickness of about 0.1 mm with a narrow break section of 1.3 cm on an Instron at a cross-head speed of 12.7 cm per minute. It is expressed as kilograms per square centimeter.
[2]Elongation at break is the percent elongation at break of the sample used to measure tensile strength as determined by the formula:
$$100 \times \frac{\text{length of sample at break} - \text{original length of sample}}{\text{original length of sample}}$$

As evidenced by the data recorded in Table I, the cured films prepared from a curable polymeric composition of the present invention, which composition contains heterogeneous polymer particles having a reactive polymer domain and a coreactive component exhibited about a 270 percent increased tensile strength when air dried and about a 250 percent increased tensile strength following cure at 120° C. for 5 minutes.

EXAMPLE 2

In a manner similar to Example 1, several curable polymeric compositions (Samples 1-4) are prepared in accordance with this invention using different percentages of the various coreactive components as specified in Table II. In addition, a polymer composition (Sample C) is prepared which is similar in all respects to Sample C of Example 1 except that 3 parts of nonylphenoxypoly(ethyleneoxy)ethanol surfactant are added thereto following its preparation.

Each of the resulting compositions is cast as a film at a wet thickness of 0.25 mm and air dried. A portion of each film is then tested for tensile strength and elongation at break. The remaining portion of each film is cured for 5 minutes at 120° C. in a forced air oven. Each film portion thus treated is then tested for tensile strength and elongation at break. The results of this testing are presented in Table II.

to room temperature. The resulting latex composition has a pH of 3.0, contains about 46.6 percent solids and the polymer particles have an average particle size of 1615 Å.

After storing the above latex for a period of 8 months, a 215-part portion of the composition is placed in a 0.5 l. flask equipped with stirrer, chilled condenser, thermocouple, heating and cooling means and a monomer and aqueous reservoir. The flask is heated to 70° C. and 2 parts of a 1 percent aqueous solution of sodium persulfate added thereto. At this time, a monomer feed of 10 parts vinylbenzyl chloride, 5 parts styrene and 5 parts n-butylacrylate is fed to the flask over a period of 1.3 hours. An aqueous feed of a 1 percent aqueous solution of sodium persulfate is added to the vessel over a 2.5-hour period, said addition starting simultaneously with the monomer feed. The temperature of the vessel is maintained at 70° C. during this addition and for an additional 2 hours. The flask is then cooled to 25° C.

TABLE II

| | Coreactive Component | | Air Dried | | | Air Dried + 5 Min. @ 120° C. | | |
|---|---|---|---|---|---|---|---|---|
| Sample | Type[1] | %[2] | Tensile Kg/cm²[3] | Tensile Strength Increase, % | Elong. %[4] | Tensile Kg/cm² | Tensile Strength Increase, % | Elong. % |
| C* | — | — | 33.1 | — | 445 | 70.0 | — | 461 |
| 1 | PEI-12 | 1.4 | 85.1 | 255 | 378 | 118.5 | 170 | 403 |
| 2 | EDA | 1.4 | 95.8 | 290 | 361 | 151.8 | 215 | 322 |
| 3 | TETA | 1.4 | 83.9 | 250 | 393 | 147.8 | 210 | 369 |
| 4 | MEA | 1.68 | 68.9 | 210 | 386 | 110.0 | 155 | 137 |

*Not an example of this invention.
[1] PEI-12 = polyethyleneimine of a number average molecular weight of 12,000 as determined by gel permeation chromatography.
EDA = ethylenediamine
TETA = triethylenetetraamine
MEA = monoethanolamine
[2] Based on the total weight of the latex solids.
[3] Same as (1) in Table I.
[4] Same as (2) in Table I.

As evidenced by the data in the aforementioned Table, the curable polymeric compositions of the present invention form films of excellent tensile strengths using any of a variety of coreactive components.

EXAMPLE 3

To a jacketed vessel similar to the reaction vessel employed in Example 1 is added 1800 parts deionized water and 0.25 part of Versenol ® 120 chelating agent sold by The Dow Chemical Company. The vessel is heated to 90° C. An aqueous feed of 508 parts water, 80 parts of an emulsifier of a low molecular weight copolymer of methyl methacrylate/2-sulfoethyl methacrylate/acrylic acid in a molar ratio of 12/1/4 and 4 parts of sodium persulfate is added to the vessel over a 6-hour period. The addition of a monomer feed of 1200 parts styrene and 800 parts butadiene, which addition takes 5 hours, is begun simultaneously with the addition of the aqueous feed. After the entire aqueous feed has been added, a mixture of 45 parts water, 1 part sodium persulfate and 0.6 part sodium hydroxide is added to the vessel for 1.5 hours. After this addition, the flask is maintained at 90° C. for about 0.5 hour and then cooled The resulting aqueous polymer dispersion consists of 48 percent solids. The heterogeneous polymer particles therein have an average particle size of about 1690 Å as determined by dissymmetry of light scattering. The reactive polymer domain of the heterogeneous polymer particle thus has an average thickness of about 37.5 Å.

To a portion of the resulting dispersion (Sample 1) is added 2 percent, based on the weight of the total solids, of ethylenediamine as a coreactive component. To a second portion (Sample 2) of the resulting dispersion is added 2 percent, based on the weight of total solids, of triethylenetetraamine as a coreactive component. A third portion of the latex (Sample C) contains no added coreactive component and is used as a control. The resulting compositions are cast to a wet thickness of 0.25 mm and air dried. A portion of the film thus formed is tested for tensile strength and elongation at break. The remainder of the film is heated for 5 minutes at 120° C. in a hot air oven and a portion of the thus treated film is then tested for tensile strength and elongation at break. The results of this testing are shown in Table III.

TABLE III

| | | Air Dried | | | Air Dried + 5 Min. @ 120° C. | | |
|---|---|---|---|---|---|---|---|
| Sample | Coreactive Component[1] | Tensile Kg/cm²[2] | Tensile Strength Increase, % | Elong. %[3] | Tensile Kg/cm² | Tensile Strength Increase, % | Elong. % |
| C* | — | 50.1 | — | 140 | 103.6 | — | 224 |
| 1 | EDA | 72.3 | 145 | 213 | 172.6 | 165 | 191 |

TABLE III-continued

| Sample | Coreactive Component[1] | Air Dried | | | Air Dried + 5 Min. @ 120° C. | | |
|---|---|---|---|---|---|---|---|
| | | Tensile Kg/cm²[2] | Tensile Strength Increase, % | Elong. %[3] | Tensile Kg/cm² | Tensile Strength Increase, % | Elong. % |
| 2 | TETA | 68.8 | 135 | 236 | 160.5 | 155 | 219 |

*Not an example of this invention.
[1]Same as (1) in Table II.
[2]Same as (1) in Table I.
[3]Same as (2) in Table I.

As evidenced by the data recorded in the foregoing Table, the curable polymeric composition of an aqueous dispersion of heterogeneous polymer particles prepared from a starting latex which has been stored for a significant time period can be cured to a film exhibiting increased tensile strengths.

EXAMPLE 4

In a manner similar to Example 3, a starting latex composition is prepared from 48 parts styrene, 50 parts butadiene and 2 parts itaconic acid. Following essentially complete conversion of the monomers, the resulting starting latex, which consists of 49.7 percent solids, and the polymer particles therein have an average particle size of 1700 Å, is cooled to room temperature and stored for 8 months.

After this storage period, 201 parts of the starting latex is heated to 70° C. To the heated latex is continuously added for 3 hours an aqueous feed of 17 parts of an aqueous solution of 0.7 percent sodium persulfate. One-half hour after initiation of the aqueous feed a one-hour continuous addition of a monomer feed of 2 parts styrene, 11 parts vinylbenzyl chloride and 3 parts n-butyl acrylate is begun. Upon the completion of the addition of the aqueous feed, the composition is cooled from 70° C. to room temperature. The resulting aqueous polymer dispersion is found to contain 49.3 percent solids and the heterogeneous polymer particles found to have an average particle size of 1760 Å. The heterogeneous polymer particles thus have a reactive polymer domain having an average thickness of about 30 Å.

To separate portions of the resulting composition are added 2 percent based on the weight of total latex solids of various coreactive components (Samples 1–3) as specified in Table IV. Another portion of the resulting dispersion has no coreactive component added thereto (Sample C).

The resulting compositions are tested for tensile strengths and elongation at break per the methods of Example 1. The results of this testing are shown in Table IV.

TABLE IV

| Sample | Additive[1] | Air Dried | | Air Dried + 5 Min. @ 120° C. | |
|---|---|---|---|---|---|
| | | Tensile Kg/cm²[2] | Elong. %[3] | Tensile Kg/cm² | Elong. % |
| C* | — | 75.6 | 316 | 74.2 | 313 |
| 1 | EDA | 38.7 | 323 | 92.2 | 324 |
| 2 | HEXAMTA | 102.9 | 312 | 103.4 | 283 |
| 3 | TETA | 44.9 | 278 | 80.0 | 297 |

*Not an example of this invention.
[1]EDA = ethylenediamine
HEXAMTA = hexamethylenetetraamine
TETA = triethylenetetraamine (3 parts of nonylphenoxypoly(ethyleneoxy)ethanol sold as Igepal CO-630 by GAF Corporation are added with the triethylenetetraamine).
[2]Same as (1) in Table I.
[3]Same as (2) in Table I.

As evidenced by the data recorded in Table IV, the curable polymeric composition of the present invention cures at 120° C. to form films having tensile strengths higher than a similar composition containing no coreactive component. However, when air dried, the cured films prepared from the curable polymeric composition of this invention are not found to always possess such increased strengths. This is believed to be due to the presence of the polymerized itaconic acid in the heterogeneous polymer particle which tends to interfere with the availability of the reactive amino hydrogens during cure.

EXAMPLE 5

In a manner similar to that of Example 1, an aqueous dispersion of heterogeneous polymer particles is prepared by the continuous addition (and subsequent polymerization) of a monomer mixture of 5 parts vinylbenzyl chloride, 7 parts butadiene and 3 parts styrene to a starting latex of polymer particles composed of 55 parts styrene and 30 parts butadiene. To the resulting dispersion is added 2.0 percent, by weight based on the weight of the heterogeneous polymer particles, of a coreactive component of triethylenetetraamine (Sample No. 1).

For comparison, an aqueous colloidal dispersion containing a homogeneous polymer particle is prepared from 58 parts styrene, 37 parts butadiene and 5 parts vinylbenzyl chloride using conventional emulsion polymerization techniques. To the resulting dispersion is added about 1.4 weight percent of triethylenetetraamine based on the weight of the polymer particles (Sample No. C-2).

Each of the resulting curable compositions is cast as a film at a thickness of about 0.25 mm and air dried. A portion of each film is then tested for tensile strength and elongation at break. The remaining portion is cured for 5 minutes at 120° C. in a forced air oven. Each film thus treated is tested for tensile strength. The results of this testing are presented in Table V.

TABLE V

| Sample No. | Polymer Particle | | Air Dried Tens., Kg/cm²[3] | Air Dried + 5 Min. @ 120° C. Tens., Kg/cm²[3] |
|---|---|---|---|---|
| | Type[1] | Reactive Monomer %[2] | | |
| C* | Homogeneous | 5 | 127 | 138 |
| 1 | Heterogeneous | 5 | 348 | 362 |

*Not an example of this invention.
[1]Type of polymer particle in the curable composition.
[2]Percent of reactive monomer employed in the preparation of the polymer particle based on the total weight of the polymer particles.
[3]Same as (1) in Table I.

As evidenced by the data recorded in Table V, the curable polymeric composition of this invention wherein the polymer particles are heterogeneous polymer particles having a reactive polymer domain, exhibit a tensile strength increase of about 270 percent on the air dried film and about 260 percent on the film cured for 5 minutes at 120° C. when compared to a similar curable polymer composition wherein the polymer particle contains the same amount of the reactive monomer which is essentially uniformly distributed throughout.

EXAMPLE 6

To a 2 gallon, glass lined, jacketed reaction vessel equipped with agitation means, heating and cooling means and a monomer and aqueous feed system is added 78 parts deionized water, 0.1 part of the sodium salt of a diphenyl oxide sulfonate surfactant, 0.5 part of a copolymer seed of 96 parts styrene and 4 parts acrylic acid and 0.01 part of a chelating agent. The reaction vessel is purged with nitrogen and then heated to about 90° C. A monomer feed of 40 parts styrene, 46 parts butadiene and 0.28 part of a chain transfer agent is continuously added to the vessel over a period of 5 hours. Stirring concurrently therewith, a separate aqueous feed of 15.8 parts deionized water, 0.4 part sodium persulfate, 0.1 part sodium hydroxide and 0.005 part chelant is continously added to the vessel for a 6-hour period. About 4.3 hours after the start of the addition of the monomer feed the polymer particles (i.e., polymer core) are found to have a number average particle size of 1410 Å and a reactive monomer feed containing 4 parts butadiene, 3 parts styrene, 7 parts glycidyl methacrylate and 0.05 part of a chain transfer agent is started. This reactive monomer feed is continuously added to the vessel for about 0.7 hour. After the entire aqueous feed has been added to the vessel, the vessel is maintained at 90° C. for an additional period of about 2 hours. During this period, a mixture of 5.4 parts deionized water and 0.2 part sodium persulfate is continuously added to the vessel. After this period, the vessel is cooled to room temperature. The resulting aqueous polymer dispersion is composed of about 51.5 percent solids, has a pH of 5.2 and contains heterogeneous polymer particles which have a number average particle size of about 1480 Å, meaning the heterogeneous polymer particle has a reactive polymer domain having an average thickness of 35 Å. To separate 10-part portions of the resulting dispersion is added 0.1 part of the various coreactive components recorded in Table VI (Sample Nos. 1-2). No coreactive component is added to another portion of the dispersion (Sample No. C).

In a similar manner, an aqueous dispersion is prepared except that the components of the reactive monomer feed, i.e., 4 parts butadiene, 3 parts styrene, 7 parts glycidyl methacrylate and 0.05 part of the chain transfer agent are added to the reaction vessel concurrently with the other monomer feed stream. Upon completion of the polymerization, the resulting aqueous dispersion is composed of about 51.6 percent solids, has a pH of about 3.45 and contains essentially homogeneous polymer particles comprised of 50 parts butadiene, 43 part styrene and 7 parts glycidyl methacrylate and having an average particle size of about 1470 Å. To separate 10-part portions of the resulting dispersion is added 0.1 part of the various coreactive components recorded in Table VI (Sample Nos. C-1 and C-2). No coreactive component is added to another 100-part portion of the resulting dispersion (Sample No. C-1).

A portion of each of the resulting dispersions is cast as a film (0.25 mm wet thickness). A first portion of each film is air dried, and a second portion of each film is heated for 5 minutes at 120° C.

Each film is tested for tensile strength and elongation at break. The results of this testing are recorded in Table VI.

TABLE VI

| | | | Treatment | | | |
|---|---|---|---|---|---|---|
| | | | Air Dried | | Air Dried + 5 Min. @ 120° C. | |
| Sample No. | Polymer Particle[1] | Coreactive Component[2] | Tensile Kg/cm²[3] | Elong. %[4] | Tensile Kg/cm² | Elong. % |
| C* | Heterogeneous | — | 23.3 | 354 | 31.5 | 381 |
| C* | Homogeneous | — | 13.5 | 207 | 14.7 | 209 |
| 1 | Heterogeneous | TETA | 97.1 | 265 | 125.4 | 258 |
| C-1* | Homogeneous | TETA | 17.7 | 147 | 27.4 | 185 |
| 2 | Heterogeneous | PPZ | 114.5 | 302 | 108.7 | 332 |
| C-2* | Homogeneous | PPZ | 19.8 | 123 | 26.5 | 202 |

*Not an example of this invention.
[1]Type of polymer particle in the aqueous colloidal dispersion.
[2]TETA = triethylenetetraamine
PPZ = piperazine
[3]Same as (1) in Table I.
[4]Same as (2) in Table II.

As evidenced by the data recorded in Table VI, films prepared by the curable composition of the present invention wherein the composition contains a heterogeneous polymer particle having a reactive polymer domain exhibits unexpectedly higher tensile strengths than a similar polymer composition wherein the composition contains an essentially homogeneous polymer particle.

What is claimed is:

1. A cross-linkable, synthetic polymer composition comprising an aqueous polymer dispersion of (1) heterogeneous polymer particles which comprise a water-insoluble polymeric core of a polymer of a conjugated diene or a copolymer of a conjugated diene with a monovinylidene aromatic and having on its surface a reactive polymer domain, said reactive polymer domain having an average thickness of up to about 100 Å and being derived from an amount of a reactive monomer bearing a non- or weakly ionic reactive halo, amino or substituted amino, or epoxy group such that the reactive groups are more concentrated in the reactive polymer domain than in the polymeric core of the heterogeneous polymer particle and (2) a water-soluble coreactive component bearing a plurality of a second non- or weakly ionic reactive group coreactive with the reactive groups of the reactive polymer domain of the heterogeneous polymer particles.

2. The cross-linkable composition of claim 1 wherein the (1) reactive monomer and (2) coreactive component are employed in amounts such that the tensile strength of a cross-linked film prepared from the cross-linkable composition is measurably higher than a film prepared in an identical manner from a composition having the same type and amount of heterogeneous polymer particles but contains no coreactive component.

3. The cross-linkable composition of claim 1 wherein the (1) reactive monomer and (2) coreactive component are employed in amounts such that the tensile strength of a cross-linked film prepared from the cross-linkable composition is measurably higher than a film prepared in an identical manner from an identical cross-linkable composition except that the composition contains homogeneous polymer particles prepared using the same amount and type of reactive monomer employed in preparing the heterogeneous polymer particle but such amount of monomer is essentially uniformly distributed throughout the polymer particle.

4. The curable composition of claim 1 wherein the reactive monomer is employed in an amount such that there is at least 0.3 milliequivalent of reactive groups per gram of the reactive polymer domain and the coreactive component is employed in an amount such that in the curable composition, the equivalents of reactive groups pendant to the coreactive component are at least about 0.5 times the equivalents of reactive groups in the reactive polymer domain of the heterogeneous polymer particles.

5. The curable composition of claim 4 wherein the polymeric core of the heterogeneous polymer particle comprises no more than about 0.03 milliequivalent of reactive groups per grams of the polymeric core, the reactive monomer is employed in amounts such that there is at least about 2 milliequivalents of the reactive group per grams of the reactive polymer domain and the correactive component is employed in amounts such that the equivalents of reactive groups pendant to the coreactive component is at least about 0.8 times the equivalents of reactive groups in the reactive polymer domain.

6. The curable composition of claim 5 wherein the reactive groups are halo and amino or substituted amino groups.

7. The curable composition of claim 5 wherein the reactive groups are oxiranyl and amino or substituted amino groups.

8. The curable composition of claim 5 or 6 wherein the reactive monomer is employed in amounts such that there are at least about 1 milliequivalent of reactive groups per gram of the reactive polymer domain and the curable composition contains an amount of the coreactive component such that the equivalents of reactive groups pendant thereto are at least about 0.8 times the equivalents of reactive groups in the reactive polymer domain of the heterogeneous polymer particles.

9. The curable composition of claim 8 wherein the water-insoluble polymeric core is a copolymer of a conjugated diene and a vinyl halide or a vinylidene halide.

10. The curable composition of claim 8 wherein the water-insoluble polymeric core comprises from about 45 to about 95 mole percent of the conjugated diene and from about 55 to about 5 mole percent of the monovinylidene aromatic, said mole percents being based on the total moles of conjugated diene and monovinylidene aromatic in the water-insoluble polymer domain.

11. The curable composition of claim 7 wherein the reactive polymer domain is derived from a monovinylidene aromatic having a halogen atom attached to a benzylic carbon atom, an olefinically unsaturated halide, a halide of an alkyl ester of $\alpha,\beta$-ethylenically unsaturated carboxylic acid or an $\alpha,\beta$-ethylenically unsaturated halide ether and the coreactive component is a polyamine of an aliphatic, alicyclic or aromatic hydrocarbon or an inertly substituted aliphatic, alicyclic or aromatic hydrocarbon which has two or more amino hydrogen atoms per molecule.

12. The curable composition of claim 7 wherein the heterogeneous polymer particle comprises a water-insoluble polymer domain derived from about 55 to about 85 mole percent 1,3-butadiene and from about 45 to about 15 mole percent styrene, and a reactive polymer domain derived from a vinylbenzyl halide, said vinylbenzyl halide comprising from about 1 to about 10 percent of the heterogeneous polymer particle and the coreactive component is a polyalkylene polyamine or a cyclic amine.

13. The curable composition of claim 7 wherein the reactive polymer domain is derived from an epoxide of an alkyl ester of $\alpha,\beta$-ethylenically unsaturated monomer and the coreactive component is a polyamine of an aliphatic, alicyclic or aromatic hydrocarbon or an inertly substituted aliphatic, alicyclic or aromatic hydrocarbon which has two or more amino hydrogen atoms per molecule.

14. The curable composition of claim 11 wherein the heterogeneous polymer particle has a water-insoluble domain derived from 55 to about 85 mole percent 1,3-butadiene and from about 45 to about 15 mole percent styrene and a reactive polymer domain derived from glycidyl methacrylate and the coreactive component is a polyalkylene polyamine or a cyclic amine.

15. The curable composition of claim 13 wherein the aqueous colloidal dispersion of the heterogeneous polymer particle is prepared by emulsion polymerizing a monomer bearing reactive substituent groups in an aqueous medium containing particles of a water-insoluble polymer.

16. The curable composition of claim 14 wherein the particles of the water-insoluble polymer are prepared by dispersing the monomers from which the polymer is prepared in an aqueous polymerization medium and exposing the monomers to a free radical polymerization means, followed by adding a reactive monomer to the aqueous medium and subsequently polymerizing the reactive monomer at conditions sufficient to form heterogeneous polymer particles.

17. A cured composition prepared from the curable composition of claim 1.

* * * * *